Patented Oct. 7, 1952

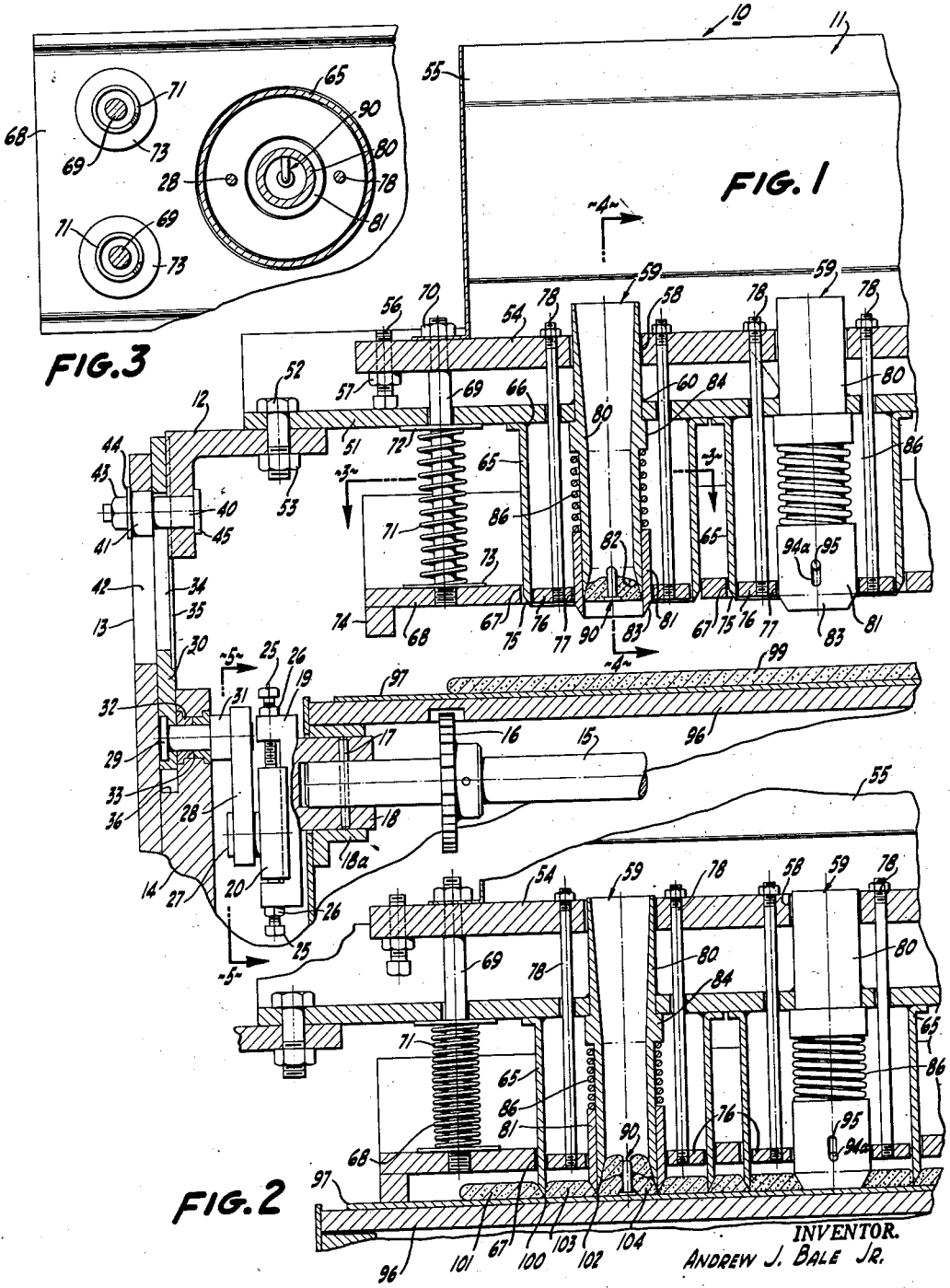

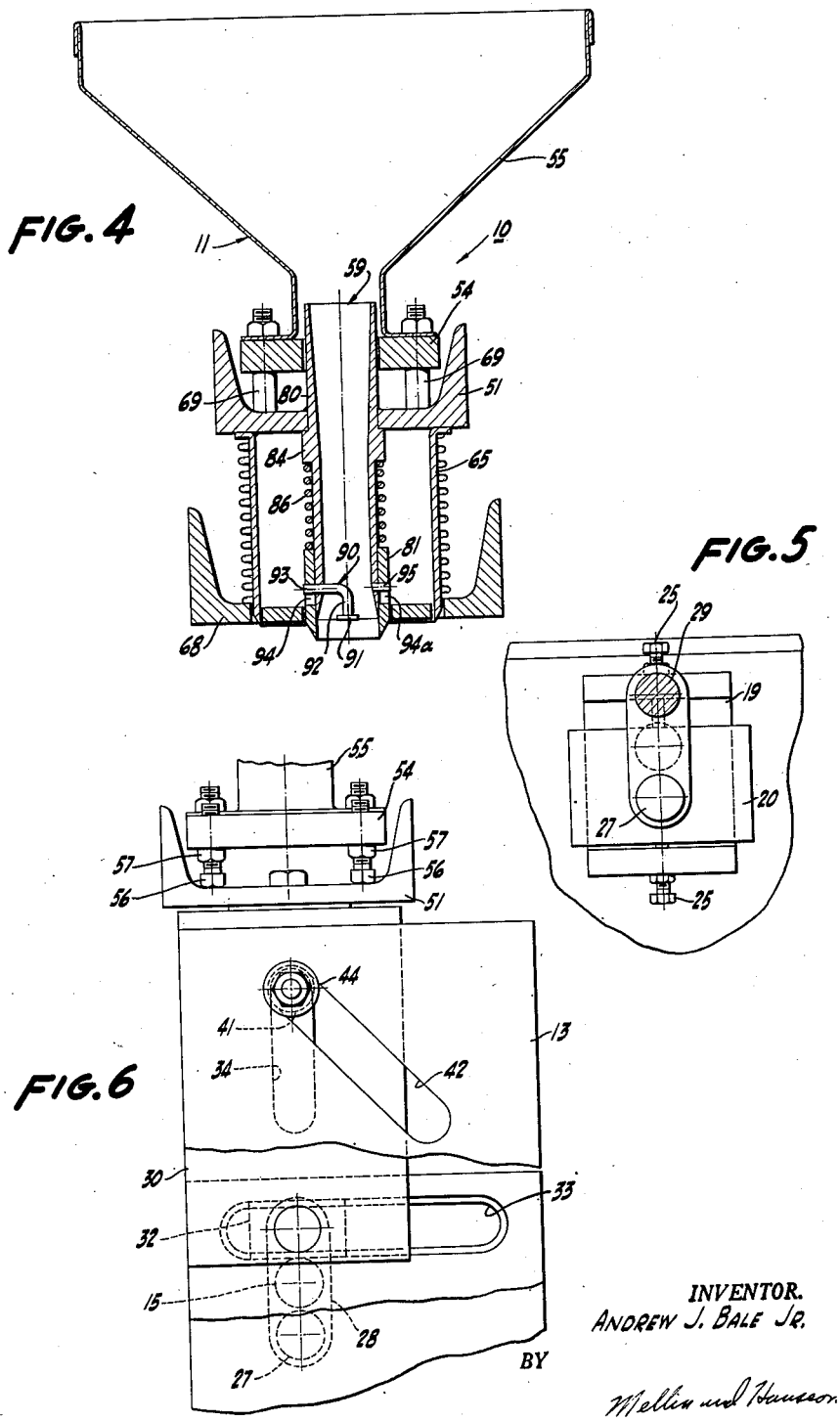

2,612,853

UNITED STATES PATENT OFFICE 2,612,853

DOUGH RING CUTTING MACHINE

Andrew J. Bale, Jr., Berkeley, Calif., assignor to Pacific Bakery Machinery Co., Oakland, Calif., a corporation of California Application January 3, 1950, Serial No. 136,598

7 Claims. (Cl. 107—25)

This invention relates to a machine for cutting doughnuts from a continuously moving sheet of dough and constitutes an improvement to the mechanism disclosed in my co-pending application Ser. No. 738,799 entitled "Doughnut Making Machine," filed April 2, 1947, now abandoned.

In general it is the object of the present invention to provide an improved form of doughnut cutting machine operable to cut or punch doughnuts from a continuously moving sheet of dough.

More particularly the object of this invention is the provision of an improved form of cutting machine adapted for use in connection with the dough kneading, sheet forming, conveying, warming and frying elements of the machine of my aforesaid co-pending application.

A further object of this invention is the provision of a machine adapted to cut doughnut rings from a continuously moving sheet of dough, the said machine having a more positive and dependable means for removing the doughnut centers cut out of the sheet of dough.

The invention possesses other advantageous features, some of which, with the foregoing, will be set forth at length in the following description where that form of the invention which has been selected for illustration in the drawings accompanying and forming a part of the present specification is outlined in full. In said drawings, one form of the invention is shown, but it is to be understood that it is not limited to such form, since the invention as set forth in the claims may be embodied in a plurality of forms.

Referring to the drawings:

Fig. 1 is a fragmentary transverse vertical section through the cutting machine of the invention;

Fig. 2 is a similar view showing the cutting elements in different operative positions;

Fig. 3 is a section taken along the line 3—3 of Fig. 1;

Fig. 4 is a section taken along the line 4—4 of Fig. 1;

Fig. 5 is a section taken along the line 5—5 of Fig. 1 showing a part of the driving mechanism;

Fig. 6 is an end elevation as seen from the left of Fig. 1, showing other parts of the driving mechanism.

The machine illustrated in these figures is designated in its entirety by the reference numeral 10, and comprises a cutting assembly 11 mounted on and supported by angle brackets 12 carried by side plates 13 in the manner hereinafter described. The side plates 13 are in turn fixed to frame brackets 14. The cutting assembly 11 is driven by a countershaft 15 in turn driven by a main driveshaft (not shown) through the medium of a chain (also not shown) and a sprocket 16 fixed to the countershaft 15. At each end the countershaft 15 is pinned at 17 to a sleeve 18 journalled in a bearing 18a. The sleeve 18 is formed at one end with a carrier plate 19 in which a slide 20 is slidably supported, its radial position being determined by means of screws 25 and nuts 26. Fixed to the slide 20 is a crank pin 27 to which a crank 28 is pivotally connected. The other end of the crank 28 is pivotally connected to one end of a pin 29 the other end of which is fixed to a slide plate 30. A spacer 31 is provided to space the crank 28 from the frame bracket 14 and a cam follower 32 is mounted on the pin 29 to ride in a horizontal cam slot 33, most clearly shown in Fig. 6.

The slide plate 30 is received at its lower end in a recess 36 formed in the frame bracket 14 and it is formed with a vertical slot 34 rabbeted or recessed at 35 to receive one leg of the angle bracket 12. A pin 40 is provided, extending through the angle bracket 12 and the slot 34 and it is provided at its outer end with a cam follower roller 41 which rides in a diagonal slot 42 best shown in Fig. 6. A nut 43 and washer 44 together with a head 45 at the other end of the pin 40 serve to retain the pin 40 and the roller 41 in their proper positions.

It will be apparent that upon rotation of the shaft 15 a compound oscillating movement will be imparted to the angle brackets 12, and therefore to the cutting assembly 11, such movement comprising a vertical component intended to accomplish the punching or cutting of the sheet to produce individual doughnuts, and a horizontal component intended to move the cutting assembly 11 and the punches thereof with and at the same rate as the moving sheet of dough during the actual punching or cutting operation, so that there is no relative movement between the cutting or punching elements and the sheet of material being cut or punched.

It will be understood, of course, that the driving means for the cutting assembly is duplicated at the other end of shaft 15.

The cutting assembly 11 comprises a punch carrier 50 having a bottom 51 serving as a punch carrier plate and fixed to the angle brackets 12 by means of bolts 52 and nuts 53. Mounted on the punch carrier plate 51 is a punch guide plate 54 which also forms the bottom of a hopper 55, the guide plate 54 being adjustable by means of screws 56 and nuts 57. The punch guide plate 54 is formed with holes 58 to slidably receive inner cutters or punches 59 welded at 60 to the carrier plate 51. Outer punches or cutters 65 are welded at 66 to the carrier plate 51 and at their lower ends are slidably received in holes 67 formed in a stripper plate 68. The stripper plate 68 is slidably supported by rods 69 fixed to the guide plate 54 by nuts 70 and threaded at their lower ends into the stripper plate. Compression springs 71 are compressed between washers 72 and 73 and operate to urge the stripper plate downwardly. The stripper plate is provided with stop members 74 as illustrated.

Outer punches 65 are formed at their lower ends with knife edges 75 and are guided and spaced from the inner punches by annular guide plates 76 having holes 77 formed therein to slidably receive the inner punches. The annular guide plates 76 are carried by rods 78 fixed at their upper ends to the punch guide plate 54. The inner punches 59 comprise telescopically arranged inner and outer members 80 and 81 having knife edges 82 and 83 respectively. Each inner member is welded to the punch carrier at 60 and is slidable through the hole 58 in punch guide plate 54, as explained hereinabove, and it is formed with an annular shoulder 84. A compression spring 86 located between the shoulder 84 and the upper edge of the outer member 81 urges the latter downwardly. It will be seen that the tapers on the knife edges 82 and 83 are oppositely disposed so that when they are located in the same plane, as shown in Fig. 2, they form in effect a single knife edge.

As is best shown in Fig. 4, a dough retainer member 90 is provided in the form of an L-shaped member having a head 91 at the lower end of its vertical leg 92 and having horizontal leg 93 extending through the inner punch member 80 and riding in a slot 94 formed in the outer punch member 81. The head 91 lies in the plane of the knife edge 82. A pin 95 fixed to and projecting from the inner member 80 rides in a similar slot 94a diametrically opposite the slot 94. The retainer member 90 and the pin 95 thus permit limited axial movement of the outer member 81 relatively to the inner member 80.

As is shown in Figs. 1 and 2, a conveyor table 96 is provided which constitutes a fixed part of the machine, and also a conveyor belt 97 which is continuously moved by any suitable means, such as that described in my above mentioned co-pending application. The conveyor belt 97 serves to carry a continuous sheet of dough 99.

The cutting or punching device thus described operates as follows: the shaft 15 is driven by any suitable means in timed relationship to other parts of the machine which knead the dough, form it into a sheet, move the conveyor belt 97 and perform other operations. Reciprocation of the punch carrier plate 51 in a vertical plane and oscillation thereof in a horizontal plane are effected through the medium of the crank 28 and the various other driving means in precisely the manner described in my above mentioned co-pending application.

Referring more particularly to Figs. 1 and 2, in Fig. 1 the cutters or punches are shown in their topmost, retracted position and in Fig. 2 they are shown in their bottom-most, advanced position and in the act of punching out a doughnut. As will be apparent, each outer punch 65 makes a circular cut 100 and it will be apparent that a residue or latticework of dough material indicated as 101 will be formed by this operation. The inner and outer punch members 80 and 81 of the inner punch 59 will telescope and will form an inner cut 102, thus forming a doughnut 103 and a center piece 104. The center piece 104 will become firmly wedged between the inner punch member 80 and the retainer member 90, the head 91 of the latter serving to extrude the dough and cause it to assume the irregular shape illustrated in Fig. 2, thereby firmly wedging or embedding the center piece 104 in the interior of the inner member 80. As the punch carrier plate 51 ascends after completion of these punching operations, each compression spring 86 will hold the outer punch member 81 momentarily in contact with the conveyor belt 97. Also, the springs 71 will hold the stop members 74 of stripper plate 68 momentarily in contact with the conveyor belt. Meanwhile the inner punch member 80 will be retracted carrying with it the center piece 104 and effectively stripping it from the sheet of dough. Thereafter, of course, the retainer member 90 and the pin 95 will seat against the lower ends of the slots 94 and 94a and the outer punch member 81 will be retracted to clear the inner punch 59 from the sheet of dough. Meanwhile, the outer punches 65 will clear the sheet of dough and after springs 71 have expanded the stripper plate 68 will be retracted.

As this cycle is repeated, the center pieces 104 will be pushed upwardly through the throat of each inner punch 80 and into the hopper 55, whence they can be removed.

It will thus be apparent that a cutting or punching device is provided for cutting doughnuts or other similarly shaped objects from a continuously moving sheet of dough. Means are provided for effectively separating and stripping a center piece from each doughnut and for stripping the residual sheet of dough and the doughnuts from the punches. Each center piece is firmly wedged in the inner punch member. It cannot fall out as the punches are retracted and must move upwardly and eventually into the hopper, as the cycle is repeated.

I claim:

1. A machine of the character described comprising telescopically arranged inner and outer punches each having a tapered punching end forming a knife edge, the taper on the inner punch being opposite to the taper on the outer punch so as to form in effect a single knife edge when the punching ends of said punches lie in the same plane, said outer punch being slidably mounted on the inner punch for limited axial movement relatively to the inner punch, spring means operable to displace the outer punch axially so that its punching edge lies beyond the punching edge of the inner punch, means for advancing said punches in unison to perform a punching operation and for retracting the punches.

2. A machine of the character described comprising inner and outer annular punches, said outer punch being slidably mounted on said inner punch for limited axial movement relatively to the inner punch, spring means urging said outer punch so that its punching end normally lies beyond the punching end of the inner punch, the punching ends of said inner and outer punches being oppositely tapered so as to form in effect a single knife edge when they lie in the same plane, and means for reciprocating said punches to alternately advance them, make a punching operation, and retract them.

3. A machine of the character described comprising inner and outer annular punches, said outer punch being slidably mounted on said inner punch for limited axial movement relatively to the inner punch, spring means urging said outer punch so that its punching end normally lies beyond the punching end of the inner punch, the punching ends of said inner and outer punches being oppositely tapered so as to form in effect a single knife edge when they lie in the same plane, means for reciprocating said punches to alternately advance them, make a punching operation, and retract them, and a centrally located retainer member mounted centrally within said inner punch.

4. A machine of the character described comprising inner and outer annular punches, said outer punch being slidably mounted on said inner punch for limited axial movement relatively to the inner punch, spring means urging said outer punch so that its punching end normally lies beyond the punching end of the inner punch, the punching ends of said inner and outer punches being oppositely tapered so as to form in effect a single knife edge when they lie in the same plane, means for reciprocating said punches to alternately advance them, make a punching operation, and retract them, and a centrally located retainer member mounted centrally within said inner punch, said retainer member having an enlarged head at its lower end located in the plane of the punching end of the inner punch.

5. A doughnut cutting machine adapted to cut doughnuts from a sheet of dough comprising a carrier member, means for reciprocating said carrier member to advance and retract it to and from a sheet of dough, an outermost annular punch carried by the carrier member for punching out the outer circumference of a doughnut, inner punching means carried by said carrier member for punching a central hole in a doughnut, said inner punching means comprising inner and outer telescopically disposed annular members having oppositely tapered punching edges forming a single knife edge when disposed in the same plane, said outer member being mounted on the inner member for limited sliding movement in an axial direction, and a spring for normally holding the punching edge of the outer member in advance of the punching edge of the inner member.

6. A doughnut cutting machine adapted to cut doughnuts from a sheet of dough comprising a carrier member, means for reciprocating said carrier member to advance and retract it to and from a sheet of dough, an outermost annular punch carried by the carrier member for punching out the outer circumference of a doughnut, inner punching means carried by said carrier member for punching a central hole in a doughnut, said inner punching means comprising inner and outer telescopically disposed annular members having oppositely tapered punching edges forming a single knife edge when disposed in the same plane, said outer member being mounted on the inner member for limited sliding movement in an axial direction, a spring for normally holding the punching edge of the outer member in advance of the punching edge of the inner member, and a centrally located retainer member having a head thereon mounted within said inner annular member with its head in the plane of the punching edge of said inner member.

7. A machine of the character described comprising a continuous conveyor arranged to carry a sheet of dough in a horizontal plane, a punch carrier disposed above the conveyor, means mounting the carrier for simultaneous oscillation in a vertical plane and in a horizontal plane, a hopper having a bottom portion mounted above the carrier, a stripper plate carried by said hopper, disposed below the carrier and mounted for movement in a vertical plane relatively to the carrier, spring means urging the stripper plate downwardly, an outer annular punch carried by the punch carrier to punch the outer circumference of a doughnut from a sheet of dough carried by the conveyor, said outer punch being slidable through the stripper plate, inner punch means for cutting the center hole in said doughnut, said inner punch means comprising an inner annular punch member fixed to the carrier, communicating with the interior of the hopper and slidable through the bottom portion thereof and through the stripper plate, an outer annular punch member telescopically mounted on the inner member for limited axial movement relatively thereto, a spring urging the outer punch member downwardly, and a dough retainer member mounted centrally within said inner member and having an enlarged head lying in the plane of the lower edge of the inner member, said inner and outer punch members being oppositely tapered to provide a single knife edge when they lie in the same plane.

ANDREW J. BALE, JR.

REFERENCES CITED

The following references are of record in the file of this patent:

UNITED STATES PATENTS

| Number | Name | Date |
|---|---|---|
| 184,562 | Waste | Nov. 21, 1876 |
| 557,554 | Clemens | Apr. 7, 1896 |
| 788,217 | Mohr | Apr. 25, 1905 |
| 1,236,620 | Storment, et al. | Aug. 14, 1917 |